Jan. 24, 1956     W. H. MILLER     2,732,219
VEHICLE SUB-FRAME AND SPRING SUSPENSION ASSEMBLY
Filed Oct. 15, 1953
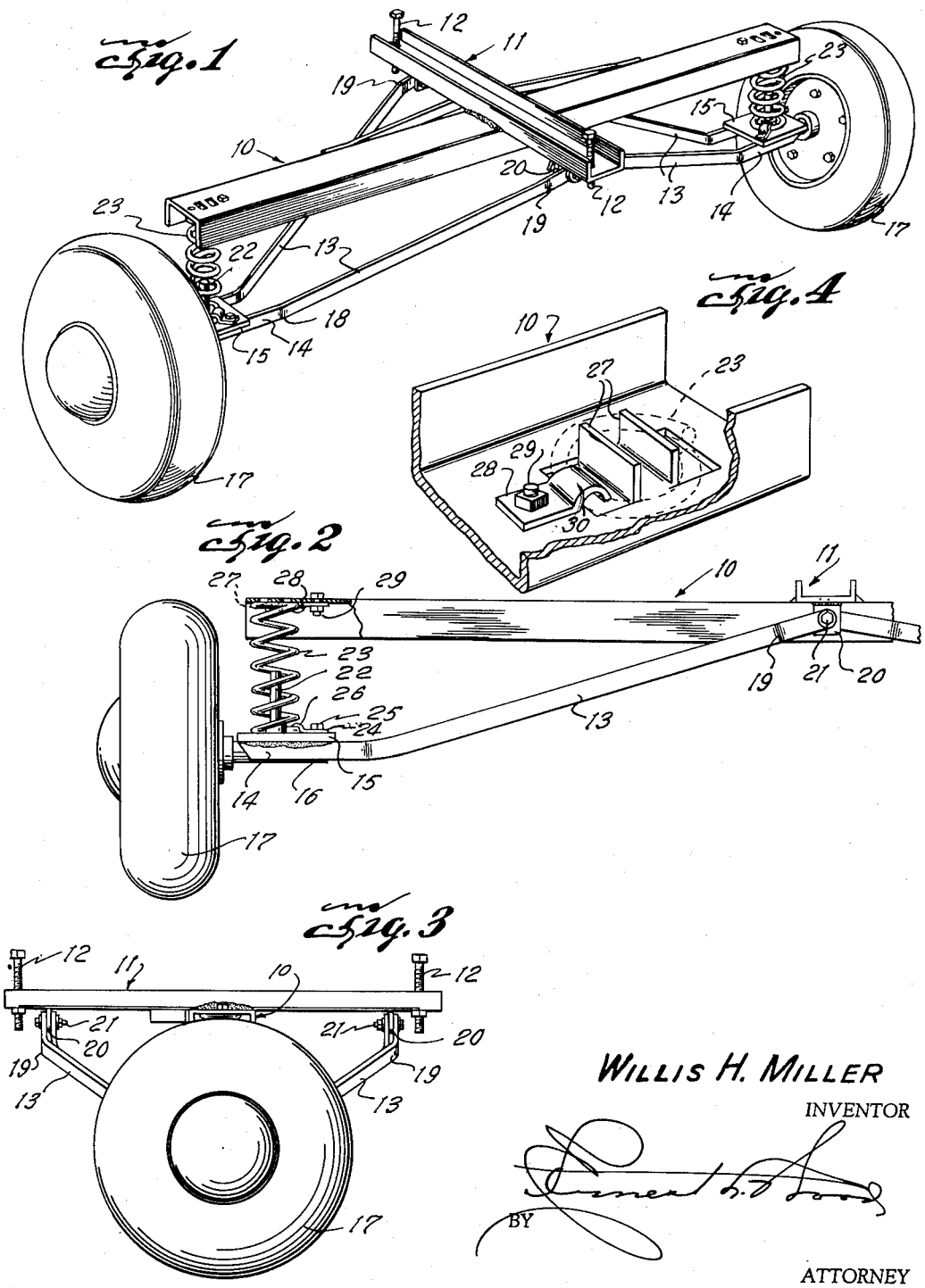
WILLIS H. MILLER
INVENTOR
BY
ATTORNEY

2,732,219

VEHICLE SUB-FRAME AND SPRING SUSPENSION ASSEMBLY

Willis H. Miller, Irving, Tex.

Application October 15, 1953, Serial No. 386,220

4 Claims. (Cl. 280—106.5)

This invention relates to vehicle wheel suspension apparatus and more particularly to an improved vehicle sub-frame and wheel suspension assembly adaptable to all types of towed vehicles.

The principal object of the invention is to provide a vehicle sub-frame and wheel suspension assembly wherein rigidly joined longitudinal and transverse frame members constitute the vehicle supporting frame, to which wheels are connected through the medium of a pair of torque frames of substantially V-shape, each having its convergent ends made rigid with a stub wheel axle while its divergent ends are pivotally joined to brackets depending from the ends of the longitudinal frame member, thereby defining a fulcrum parallel with the major axis of the latter frame member. Such an arrangement, incorporating a vertical coil spring biasing apart the stub wheel axles and the ends of the transverse frame member produces a knee-action effect with the common fulcrum points of the torque frames located below and centrally of the longitudinal frame member and in the same plane.

Another object of the invention is to provide a mounting clamp for each end of each of the coil springs which contributes to the ease by which the structure can be assembled and disassembled by factory or consumer, making possible compact storage and shipment.

Other objects will appear as the description proceeds, when considered with the accompanying drawings, wherein:

Figure 1 is a top perspective view of the invention.

Figure 2 is a fragmentary front elevational view, partly in section.

Figure 3 is an end elevational view, and

Figure 4 is a perspective view of one of the spring holding clamps, partly broken away.

This application is a continuation-in-part of application filed March 28, 1951, Serial No. 217,965, now Patent No. 2,660,443, dated November 24, 1953.

Continuing with a more detailed description of the drawing, reference numeral 10 denotes an inverted channel member defining a transverse frame member, to the top of which is welded or otherwise rigidly secured a channel member 11, defining a longitudinal frame member which is equipped at each end with bolts 12 by which a vehicle body or tongue may be secured to the frame.

It is important in the interest of equilibrium that the wheel or torque frames oscillate about aligned fulcrum points located at the longitudinal center of the vehicle supporting frame. These torque frames are each comprised of a pair of rods or arms 13, arranged in a substantially V-shape and which converge into parallel ends 14 which are welded or otherwise secured to a plate 15, as shown. At the same time, the ends 14 are in like manner secured to the stub axle 16 of a wheel 17. The relatively parallel ends 14 of the arms 13 are normally parallel with the transverse frame member 10 while the arms 13 are turned diagonally upward from a bend at 18, the arms becoming divergent at this point and as a result, the upper ends of these arms terminate at points equidistant from the center line of the transverse frame member 10 or adjacent the ends of the longitudinal frame member 11. Each arm 13 is again bent at 19 adjacent its upper end so that the ends of the arms will be in parallelism with the longitudinal axis of the transverse frame member 10.

Affixed to and depending from the undersurface of the longitudinal frame member 11 is a bracket 20 through which passes a bolt 21. The upper end of each of the four arms making up the two torque frames is apertured to receive the bolts 21, the adjacent ends of the arms 13 on each side of the transverse frame member 10 being disposed one on each side of the bracket supporting said arms. The bolts 21, forming the fulcrum points about which the torque frames oscillate are in axial alignment and in a plane parallel with the major axis of the longitudinal frame member 11.

Each of the plates 15 has a post 22 rising perpendicularly therefrom serving as a stop for the frame member 10 and about which is mounted a coil spring 23, the lower end of the spring being anchored by means of a clamp consisting of a metal strap 24 secured at one end to the plate 15 by a bolt 25 and formed at its opposite end into a hook 26 adapted to overlie the bottom convolution of the spring 23. The upper ends of the springs 23 support the ends of the transverse frame member 10 and these springs bias apart these frame members 10 and the axles 16, thereby maintaining equal balance of the wheels as well as insuring, through the cooperation of the torque frames 13, proper equilibrium of the load on the supporting frames in relation to the center of gravity.

In Figure 4 is shown the manner in which the upper ends of the coil springs 23 are secured to the ends of the transverse frame member 10. The frame 10 is shown inverted in this figure and is provided with parallel flanges 27 struck inwardly from the web of the channel member forming the frame member 10. These flanges are substantially equal in length to the inner diameter of the coil spring 23, shown in dotted lines as being seated to receive the flanges 27 which prevent lateral displacement of the spring. A clamp 28, similar to clamp 24, previously described, is secured by a bolt 29 to the web of the channel member and has a hook 30 engaging over the top convolution of the spring 23 to hold the spring and frame member 10 in secure relationship.

Manifestly, the construction as shown and described is capable of some modification and such modification as may be construed to fall within the scope and meaning of the appended claims is also considered to be within the spirit and intent of the invention.

What is claimed is:

1. A vehicle sub-frame and wheel suspension assembly comprising a rigid superstructure composed of a transverse frame member and a longitudinal frame member affixed thereto at right angles, a stub axle and wheel at each end of said transverse frame member, a plate affixed to each stub axle, a bracket affixed to the underside of said longitudinal frame member adjacent each end thereof, a pair of substantially V-shaped torque frames, each comprising a pair of arms having parallel ends affixed to said plate one on each side of said stub axle, said arms being upwardly divergent toward opposite ends of said longitudinal frame member, and pivoted to said brackets to form fulcrum points about which said arms oscillate, a coil spring interposed between the outer ends of said transverse frame member and said plate therebelow and means for securing said springs against longitudinal and lateral displacement.

2. A vehicle sub-frame and wheel suspension assembly comprising a rigid superstructure composed of a longitudinal and a transverse frame member, said members being rigidly secured together in right angular relationship, a wheel and stub axle below each end of said transverse frame member, a spring bearing plate affixed to each stub axle on a horizontal plane, a bracket depending from said longitudinal frame member adjacent each end thereof, a pair of torque frames, each consisting of a pair of arms disposed diagonally one on each side of said transverse frame member, means oscillatably connecting the divergent ends of said arms to said brackets on said longitudinal frame member, the arms of each of said torque frames being downwardly convergent and secured to said bearing plate one on each side of said stub axles, a coil spring disposed on said plate between each of said stub axles and an end of said transverse frame member and means for holding said coil springs in operative position.

3. A vehicle sub-frame and wheel suspension assembly comprising a pair of wheels, each having a stub axle, a transverse frame member and a longitudinal frame member rigidly secured together at right angles, a spring bearing plate affixed to each stub axle on a horizontal plane, a bracket depending from said longitudinal frame member adjacent each end thereof, a pair of torque frames, each comprising a pair of arms secured at one end to one of said bearing plates, said arms being upwardly divergent and pivoted at their opposite ends one to each of said brackets which are disposed at points equidistant from said transverse frame member and helical spring means interposed between each end of said transverse frame member and a bearing plate therebelow.

4. A vehicle sub-frame and wheel suspension assembly comprising a pair of wheels, each having a stub axle, a transverse member and a longitudinal frame member rigidly secured together at right angles, a pair of flanges struck from said transverse frame member adjacent each end thereof and disposed perpendicular thereto, a spring bearing plate affixed to each stub axle in confronting relation to the flanges of said transverse member, a coil spring interposed between said plate and the end of said transverse member and held at its upper end against lateral displacement by said flanges, a clamp secured to said transverse frame member and engaging a convolution of said spring to secure said spring and said transverse member together, a bracket depending from said longitudinal frame member adjacent each end thereof, a pair of torque frames, each comprising a pair of arms secured at one end to one of said bearing plates, said arms being upwardly divergent and pivoted at their opposite ends one to each of said brackets which are disposed at points equidistant from said transverse frame member.

References Cited in the file of this patent

UNITED STATES PATENTS

| | | |
|---|---|---|
| 2,030,710 | Oppolo | Feb. 11, 1936 |
| 2,113,382 | Oppenheimer | Apr. 5, 1938 |
| 2,228,107 | Best | Jan. 7, 1941 |